C. ELLIS.
PROCESS OF DRYING SULFITE WASTE LIQUOR.
APPLICATION FILED AUG. 27, 1917.
1,311,218.
Patented July 29, 1919.
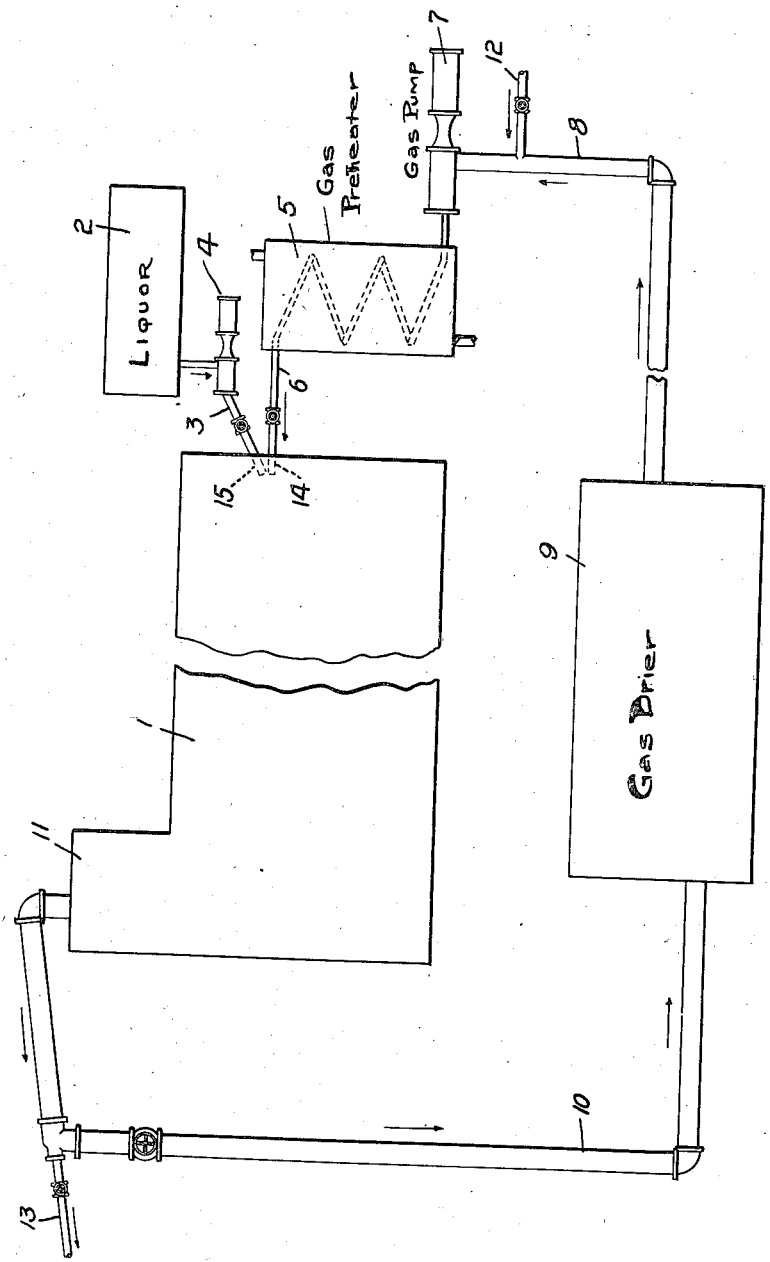

UNITED STATES PATENT OFFICE.

CARLETON ELLIS, OF MONTCLAIR, NEW JERSEY, ASSIGNOR TO ELLIS-FOSTER COMPANY, A CORPORATION OF NEW JERSEY.

PROCESS OF DRYING SULFITE WASTE LIQUOR.

1,311,218. Specification of Letters Patent. Patented July 29, 1919.

Application filed August 27, 1917. Serial No. 188,360.

*To all whom it may concern:*

Be it known that I, CARLETON ELLIS, a citizen of the United States, and a resident of Montclair, in the county of Essex and State of New Jersey, have invented certain new and useful Improvements in Processes of Drying Sulfite Waste Liquor, of which the following is a specification.

This invention relates to a process of making a binding agent and relates particularly to a method of producing from sulfite cellulose waste liquor a solid body, preferably one in a powdered state or pulverulent form which has certain desirable characteristics in the preferred form, such as, for example, a fairly high resistance to climatic conditions when packed in bulk not readily becoming sticky or gummy on exposure to somewhat humid atmosphere for a considerable period and to other properties, as will be hereinafter fully described with various illustrative applications of such a binding agent in the arts. The application of this material in the manufacture of briquets particularly will be described. As stated in my copending application Serial No. 779,516 instead of concentrating the sulfite liquor material to a syrupy body, of say, 30° B., which is about the strength of the commercial concentrated liquor, I carry the concentration much further, removing preferably almost the entire content of water, preferably doing this in the presence of small quantities of oxygen, so that the oxidation of the preferred semi acid product occurs in slight measure, thereby during the concentration giving the material what may be termed a "quick aging" treatment so that those bodies which are of relatively slight stability are oxidized to the required extent. In the present application I make use of this method of oxidation in a predetermined manner so as to produce a product which will be termed quick aged, in which bodies that are of relatively slight stability are oxidized to the required extent, producing a more stable product which will keep better and be more suitable as a binder for many purposes. The drying may be carried out in a current of an inert gas or in an atmosphere containing only a small quantity of oxygen, as for example, in air which has been depleted of its oxygen to a very considerable degree, or to such an extent that the oxidation occurs in a desirably selective manner. For example, a thick syrup may be formed and then concentrated by atomization employing an atomizing gas containing a diminished amount of oxygen. This may be carried out in one way by causing a body of gas initially of, for example, the composition of air to be circulated through an atomizing system in which the air in a heated state is mixed with the sulfite liquor syrup and sprayed under conditions to atomize the material producing a dry powder while some of the oxygen is absorbed in the process. The gas coming from the atomizing apparatus is collected, freed from its water and subsequently reheated and passed into the atomizing system and in this manner it circulates through the system becoming reduced in oxygen gradually and the deficiency thereof after a certain point is reached may be made up by the addition of fresh quantities of air. Thus the product may be given a quick aging treatment to stabilize the material by the oxidation of bodies which are of relatively slight stability. A product is obtained which is a finely granular or pulverulent material and is readily soluble in water. It is quite stable in the dry form but has the property when prepared by the preferred method of becoming more or less insoluble on protracted exposure to air or moisture so that it may be used to advantage as a binder under various conditions where a certain degree of dampness or moisture is present. In place of using gases of diminished oxygen content as indicated above, various other gaseous products may be used for drying purposes, (although less advantageously) as for example, carbon dioxid, nitrogen, or any other gas of a cheap character, especially those obtained in by-product operations and it is also possible to use stack gases or products of combustion containing nitrogen, carbon dioxid and an amount of oxygen less than that present in air, with which gases an oxidizing treatment may be carried out if desired. Similarly gases from lime kilns and Portland cement kilns containing a relatively large amount of carbon dioxid may be used, especially with sulfite liquor of more highly sensitive character.

As I have stated in Serial No. 779,516 waste sulfite cellulose liquor solids in the form of a powder or granular fragmental material or in paste form may be prepared in such condition as to be readily soluble in water so that the dried stock material may be reduced or dissolved in water to make a solution of the desired density and viscosity at the time of use. The concentrated sulfite cellulose liquor of, say, a gravity of 30 Bé., as such is a fairly stable composition but being dried to a solid material such as a powder, is likely to undergo undesirable changes which would render it insoluble or prone to become insoluble in storage. By employing the method described herein a product is obtained which is of a dry, fragmental or pulverulent character of such stability that it may be packed in slack cooperage, such as flour barrels which are pervious to air and in this condition may be stored in such air-pervious packages for an indefinite period without becoming sticky and agglutinated even in air containing a fair amount of humidity. In the preferred form of the present invention a pulverulent product is used which shows quite a marked resistance to atmospheric influences; as for example, when a fine powder of ordinary dried solids of sulfite liquor is exposed in thin layers to air, in a short time it tends to become rather sticky and gummy, while in the present case the pulverulent material in the preferred form is more resistant under like test and yet is of a sufficiently unstable nature to be suitably coagulated when heated in a briquet under normal coagulating conditions.

In the present invention, I indicate especially the employment of sulfite waste liquor without previous neutralization, that is, in its orginal fully acid condition or after the neutralization of a part (say about half) of the original fixed acid present. This is referred to, as in the above mentioned application 779,516 (renewal No. 239,882) as "semi-acid".

Solutions of the dry sulfite liquor solids may be readily made by dissolving these solids in water to produce solutions of any desired strength, such for example, as a syrupy composition of 25–30° Bé. containing say, 30–50% of solid material and in place of water as a solvent aqueous media of various kinds, such as saline solutions and the like may be employed to such an extent as may be desired.

In the process of the present case, if the liquor contains a substantial amount of free sulfurous acid, at the time of introducing the same into the atomizing apparatus, this will be in part driven out by the heat and in part driven out by the air blast coming into close proximity with the small drops of liquor.

The accompanying diagrammatic drawing illustrates a method of procedure which may be employed in carrying out the present invention. The drawing shows in elevation a drying chamber with various accessories and connections required in such embodiment.

In the drawing, 1 is an atomizing chamber. 2 is a tank holding the sulfite liquor, which may be dilute or concentrated to a syrupy condition. 3 is a sulfite liquor discharge pipe connected with the pump 4. 5 is a gas or air preheating chamber having the outlet pipe 6. This chamber is supplied by the pump or compressor 7. 8 is a gas or air main leading to pump 7 from the drying chamber 9. 10 is a pipe or conduit connecting the chamber 9 with the discharge pipe of the chamber 1. The discharge or exit pipe of chamber 1 is situated in a tower or dome 11. 12 is an inlet pipe for the introduction of air or gas and 13 is a discharge pipe for waste gases and moisture. 14 and 15 are atomizing nozzles.

In the operation of the process according to the form shown in the present illustration, a quantity of sulfite liquor is present in the tank 2 and is forced by means of pump 4 through the pipe 3 and through the nozzle 15 into the chamber 1. At this point it meets with a jet of air or gas coming from the pipe 14 and the sulfite liquor is atomized in contact with heated air. The liquor is dried to a fine powder which is collected in the drying chamber and removed through apertures which are not shown in the diagrammatic drawings used in the present illustration. The gas or air laden with moisture passes up into the tower 11 and is withdrawn through the pipe 10. Any excess of gas not required for subsequent operation in the drying cycle is discharged through the pipe 13. The gases required for use in the drying chamber are carried back by the pipe 10 through the drying chamber where the water is removed and then pass on to the pump 7. If the gas mixture at this point is not of the requisite composition it may be admixed with fresh air or with gases such as gases of combustion containing carbon dioxid to keep the oxygen content below the point at which too violent an oxidation would occur during the atomizing stage. The gas mixture is pumped through the preheater 5 and the temperature is raised to the proper drying point when the gases then issue by the pipe 6 through the nozzle or jet 14 and atomize fresh quantities of the sulfite liquor. Thus the gas travels in a circular manner with the introduction of fresh air or gas as may be required and with suitable drying to the extent desired. In the same manner preheating of the gas is carried on to such an extent as is needed. If the gas mixture entering at 12 consists of hot products of combustion, preheating may not be required to the same extent, or may be dispensed with entirely.

In recapitulation, my invention is concerned particularly with the production of a binding compound from sulfite cellulose waste liquor, which compound is constituted of or contains the dried solids thereof as yielded, for example, by removal of the moisture from the raw or partially concentrated liquor by drying gases containing oxygen in lesser amount than present in ordinary air (water vapor being excluded from consideration) such removal of moisture being carried on by the desiccating action of the drying-gases (as by atomization) until a sufficient amount, at least, of moisture has been removed to furnish dried solids of the desired character.

What I claim is:—

1. The process of making a binding agent which comprises drying to a solid state a solution containing the solids of sulfite cellulose waste liquor in an atmosphere containing some oxygen but a substantially lower percentage thereof than the percentage normally contained in ordinary air to slightly oxidize a portion at least of the solid bodies present to produce a quick-aged and stabilized dried material.

2. The process of drying and quick-aging sulfite cellulose waste liquor which comprises drying a solution containing the solids thereof by atomizing in the presence of a drying gas containing oxygen present in a proportion smaller than that present in ordinary air.

3. In the process of making waste cellulose sulfite liquor dried solids from aqueous solutions thereof, the step which comprises slightly oxidizing said solids in the course of the drying stage by exposure to an oxidizing atmosphere containing some oxygen but a substantially lower percentage thereof than the percentage normally contained in ordinary air.

4. The process of making a binding agent, which comprises drying to a solid state, sulfite cellulose waste liquor in the presence of oxygen sufficient only to slightly oxidize the more sensitive bodies present, whereby the dried material is quick-aged and stabilized.

5. The process of drying and quick-aging sulfite cellulose waste liquor, which comprises drying the solids thereof in an acid state by atomizing in the presence of a drying gas containing oxygen present in a proportion less than that present in ordinary air.

6. The process of making a finely granular or pulverulent material from sulfite cellulose waste liquor, which comprises concentrating the liquor after a partial but not substantially complete neutralization of the acidity thereof, such concentration being sufficient to remove almost the entire content of water in the presence of small quantities of oxygen so that oxidation occurs in slight measure, thereby during concentration giving the material a quick-aging to oxidize bodies of relatively slight stability.

7. The process of making a finely granular or pulverulent material from sulfite cellulose waste liquor, which comprises concentrating an acid waste liquor to remove almost the entire content of water in the presence of small quantities of oxygen so that oxidation occurs in slight measure, thereby during concentration giving the material a quick-aging to oxidize bodies of relatively slight stability.

8. The herein described process of producing a binder composition, which consists in adding an alkaline substance to normally acid sulfite waste liquor until the normal acidity thereof is reduced a substantial amount, but not approximately entirely neutralized, and evaporating the liquid product by atomization in the presence of oxygen, to a solid form.

9. The herein described process of treating waste sulfite cellulose liquor which comprises neutralizing a substantial part of the acidity of said liquor, but leaving the liquor substantially acid, and thereafter evaporating the said liquor substantially to dryness in the presence of an oxygen-containing gas, so that the product is oxidized but remains water-soluble.

10. In concentrating acid sulfite waste liquor, the step of removing a material part, but not substantially all, of the acidity of the liquor and concentrating the liquor, such operations including blowing a current of air into contact with the liquor in a substantially acid state.

11. The process of treating cellulose sulfite waste liquor which comprises eliminating a material part, but not approximately the entire amount of the original acidity and concentrating the liquor of reduced acid content, such process involving treating the liquor with a blast of gaseous vehicle containing free oxygen.

12. A process which comprises drying by atomization a liquid sulfite cellulose waste liquor material, and at some stage of the process chemically altering some relatively unstable organic constituent therein.

13. The herein described process of producing a binder composition, which consists in adding an alkaline substance to normally acid waste sulfite cellulose liquor until the normal acidity thereof is reduced only about one-half, and evaporating the liquor thus treated, in the presence of oxygen, to a solid state.

CARLETON ELLIS.